Sept. 18, 1951     T. J. FLIPPIN     2,568,330
EXTENSIBLE RAMP FOR SHIPS
Filed Oct. 19, 1945     6 Sheets-Sheet 1
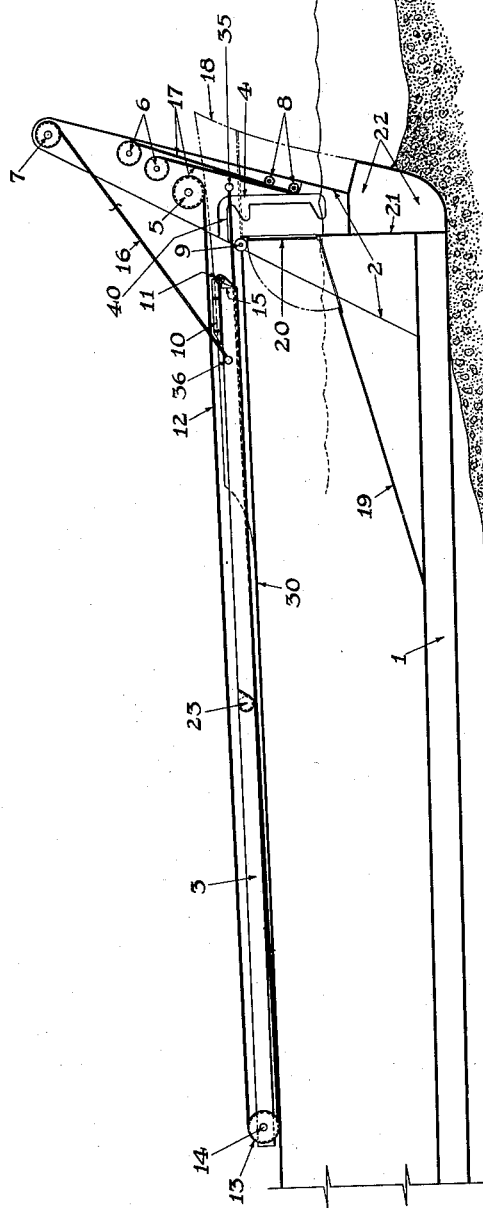
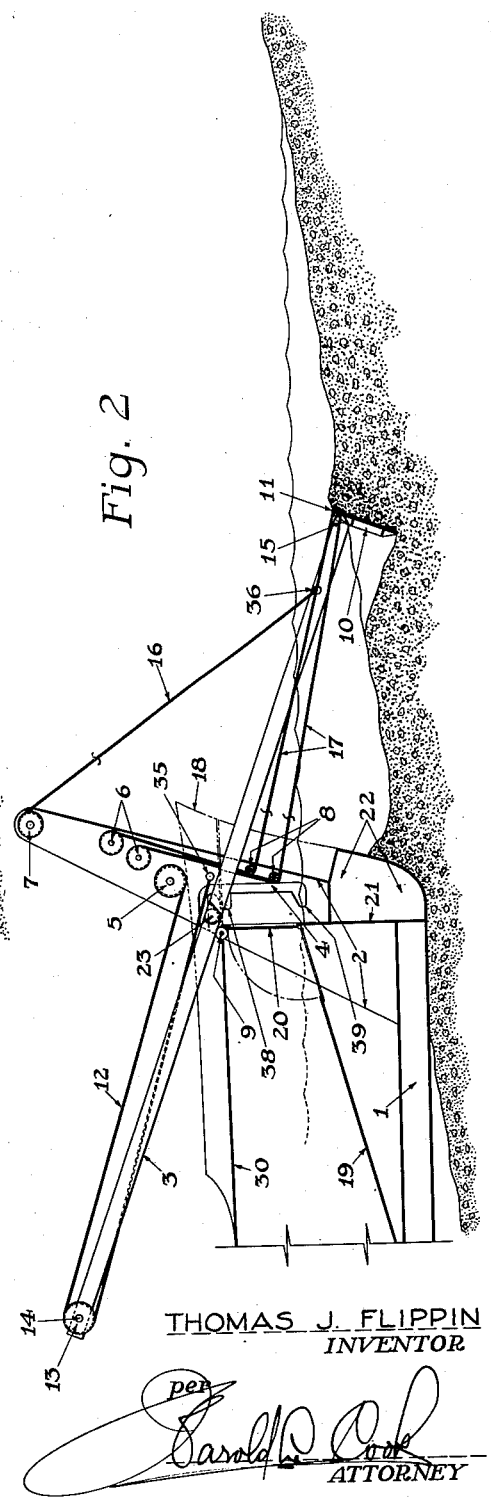
THOMAS J. FLIPPIN
INVENTOR
ATTORNEY Sept. 18, 1951 T. J. FLIPPIN 2,568,330
EXTENSIBLE RAMP FOR SHIPS
Filed Oct. 19, 1945 6 Sheets-Sheet 2
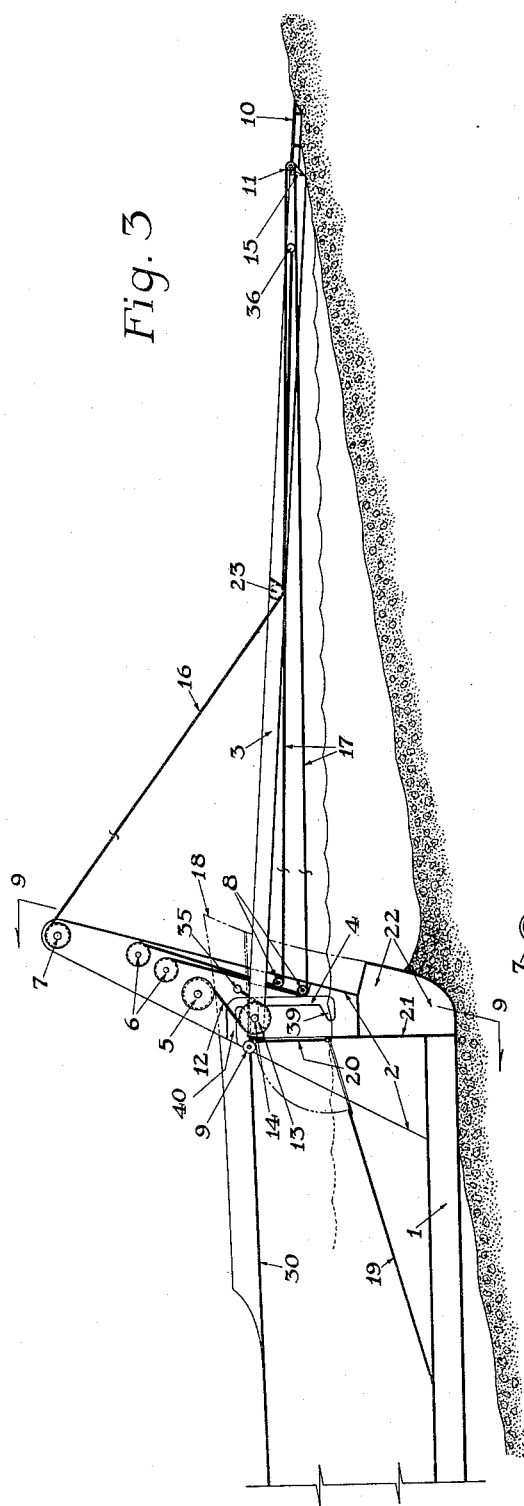
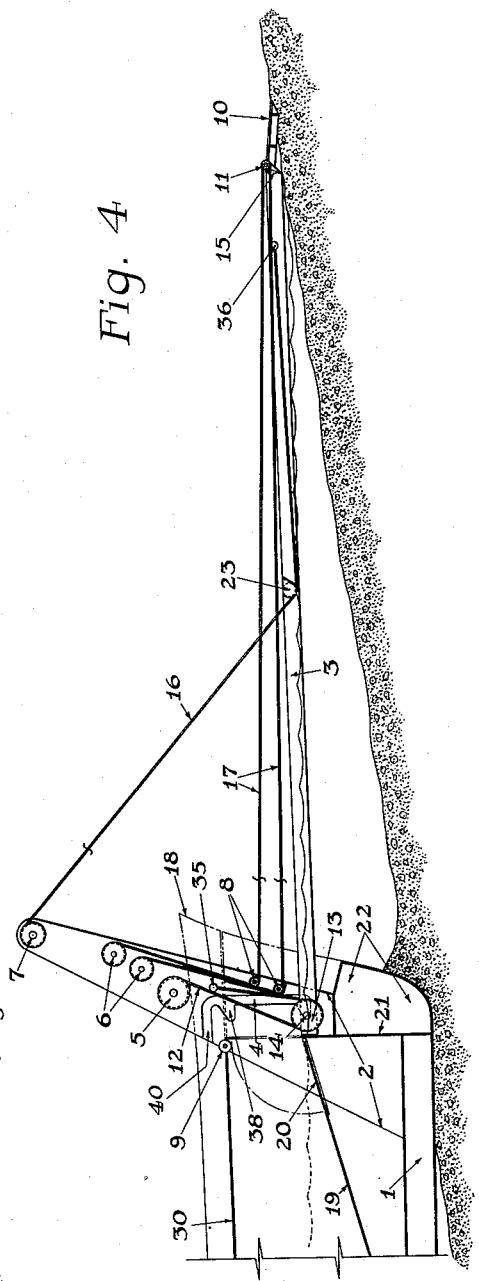
THOMAS J. FLIPPIN
INVENTOR
ATTORNEY Sept. 18, 1951 T. J. FLIPPIN 2,568,330
EXTENSIBLE RAMP FOR SHIPS
Filed Oct. 19, 1945 6 Sheets-Sheet 3
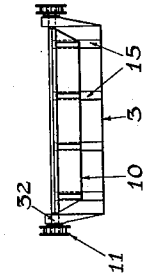
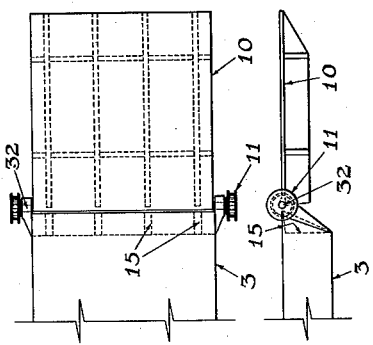
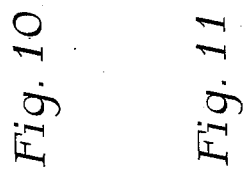
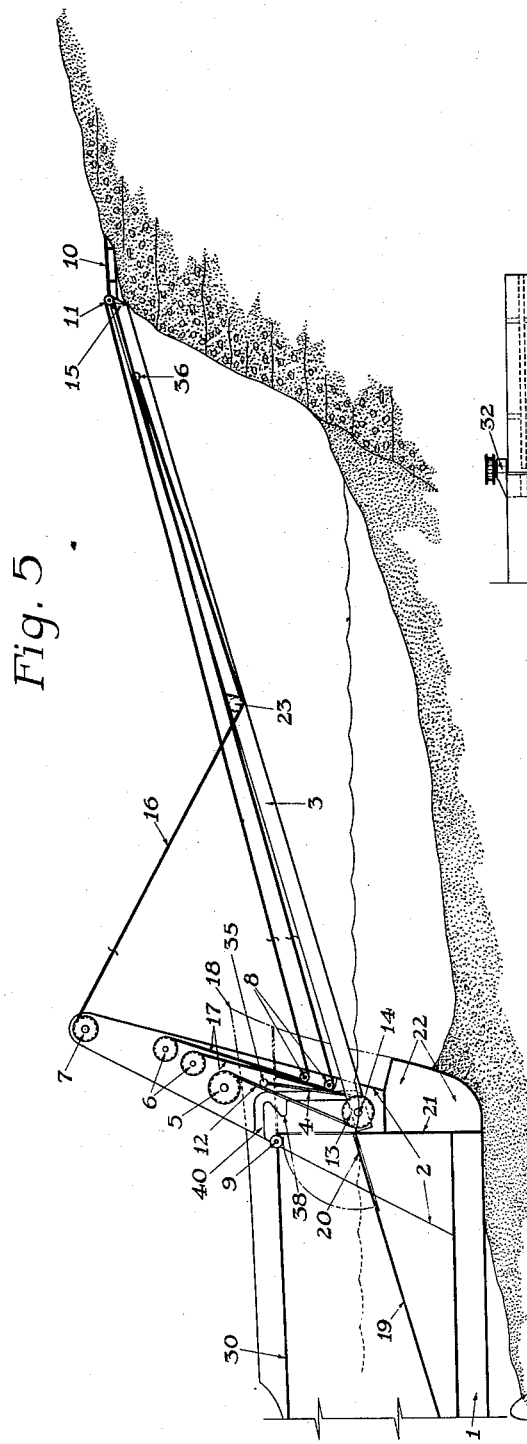
THOMAS J. FLIPPIN
INVENTOR
per
ATTORNEY Sept. 18, 1951 T. J. FLIPPIN 2,568,330
EXTENSIBLE RAMP FOR SHIPS
Filed Oct. 19, 1945 6 Sheets-Sheet 4

THOMAS J. FLIPPIN
INVENTOR
per
ATTORNEY

Patented Sept. 18, 1951

2,568,330

UNITED STATES PATENT OFFICE 2,568,330

EXTENSIBLE RAMP FOR SHIPS

Thomas J. Flippin, Portland, Oreg.

Application October 19, 1945, Serial No. 623,356

28 Claims. (Cl. 114—0.5)

This invention relates to an improved extensible ramp and operating mechanism therefor on shipboard to provide a self-contained means for rapidly loading and unloading a shallow draft vessel in places where conventional harbor installations and facilities do not exist.

Known ramps used for this purpose in the past all have numerous shortcomings which greatly limit their usefulness. In most conventional ramp ships the ramp is hinged at one end like a drawbridge, so that the length of the ramp is limited to the distance between decks at the bow. In other ships the ramps are carried in different ways, but in all cases a particular type and slope of beach is required for their effective use. Even with the proper kind of beach, powerful pumping equipment has heretofore been necessary to pump large quantities of water from ballast tanks in the bow to the stern tanks to permit the ship to get into shallow water where the end of the ramp can rest on the bottom at a suitable angle. Even with the bow of the ship lightened as much as possible, and with the ship run hard aground, the end of the ramp still frequently drops into water too deep to permit the use of the ramp. This is particularly true where the ship encounters a shallow shoal or sand bar just offshore, allowing the end of the ramp to drop into deeper water between the ship and the shore. In attempting to ground as far inshore as possible, such ships are frequently unable to free themselves and must remain until the next high tide comes to float them off. In any event, ships with the conventional short ramps are limited to beach landings and cannot load or unload on a high bank or sea wall where the best land and water approaches often are found.

A shortcoming of vessels attempting to gain the advantages of long unobstructed cargo holds but loading and discharging with the conventional mast and boom derricks is that the size of hatch openings required so interrupts or breaks the continuity of main structural members under the weather deck as to seriously impair the strength and seagoing capacity of the vessel. Present vessels of ramp type are subject to the same objection, since to carry a deck load a large opening is required in the weather deck to accommodate either an elevator or inclined interior ramp to bring cargo up from below. This invention will not require any opening in the weather deck so large as to break the continuity of any strength member in the frame of the vessel regardless of type of cargo to be handled.

In ramped vessels heretofore produced, the ramp is limited to one exact size and type by its function as a fixed element in the vessel's structure. This invention introduces a ramp which is not, in itself, an integral part of the ship's construction and, therefore, can be stowed either on the deck of the vessel, on top of a deck load, or on a framework erected on the deck. Because of its independence of the vessel's structure, a variety of ramps, standardized as to their inner and outer ends, could be exchanged, one for another, without altering the basic structural elements of a vessel once constructed for the use of this device. For instance, a ship in the grain trade might use an extremely long ramp equipped with a belt conveyor. The same vessel could be switched readily to the transport of logs, poles or piling to be loaded directly from the water by the substitution of a shorter ramp equipped with a chain conveyor, and the transport of a variety of other cargoes involving varying loading conditions. By using a ramp which is not a structural part of the vessel, a wide variety as to design, type and manner of application is provided.

The general object of the present invention is to provide a novel extensible ramp construction which will eliminate the difficulties and shortcomings above mentioned, and which will have additional advantages and facilities far beyond the utility of the conventional ramp.

Another object is to provide means for handling a ramp of unusual length which may be extended from the ship to the shore or into relatively shallow water adjacent the shore.

Another object is to provide means for supporting a long ramp in its mid portion so that the ramp may be light in weight and yet adequate to support the load.

Another object is to provide a novel construction and mechanism for extending and retracting the ramp, which may be incorporated in new ships under construction, and which may also be applied to certain types of existing ships without excessive alteration thereof.

Another object is to provide expedient loading and unloading equipment for a ship without weakening the structure of the ship so as to render it less strong or seaworthy.

Another object is to provide ramp type loading and unloading equipment for a ship in such a manner as to obviate the necessity for the usual large deck hatches and other obstructions which weaken the ship and reduce the available cargo space on the weather deck.

Another object is to provide an extensible ramp of universal application to all kinds of shore line, such as beaches, sea walls and high banks, and which may also be used to pick up floating cargo.

Another object is to provide an extensible ramp which may be stowed on top of a deck load if desired.

Another object is to provide an extensible ramp which may be employed to shove the vessel off when grounded.

Other objects and advantages reside in the construction and arrangement of parts shown in the accompanying drawings illustrating a preferred embodiment of the invention. The invention, however, is not limited to the exact details of construction shown on the drawings, as many equivalents and alternatives will occur to those skilled in the art, and all such modifications as fall within the scope of the appended claims are included in the invention.

In the drawings:

Figure 1 is a longitudinal sectional view of the bow portion of a ship embodying the present invention, the ship having run aground in a position to extend the ramp;

Figure 2 shows the ramp employed to shove the beached vessel off into deep water;

Figure 3 is a view similar to Figure 1, showing the ramp extended from the weather deck onto the beach just above the water line;

Figure 4 is a view similar to Figure 3, but with the ramp extended from the cargo space in the hold;

Figure 5 is a view of the bow of a ship aground with the ramp extended from the hold space to the top of a high bank;

Figure 10 is an enlarged plan view of the adjustable apron at the end of the ramp;

Figure 11 is a side elevation view of the apron; and

Figure 12 is an end elevation view of the apron.

The invention is illustrated as applied to a shallow draft ship longitudinally framed, designed and built around two keelsons or longitudinal stringers instead of the usual keel member. The keelsons are carried upward and forward from the inner bottom space 1 as integral members to well above the weather deck 30 to form king posts 2 on which are mounted the winches for handling the ramp. If the ship does not have two keelsons suitably spaced for this purpose, the king posts may be attached to sister keelsons or other strength members to transmit back to the frame of the ship the stresses produced by the ramp and its load.

Figure 8:
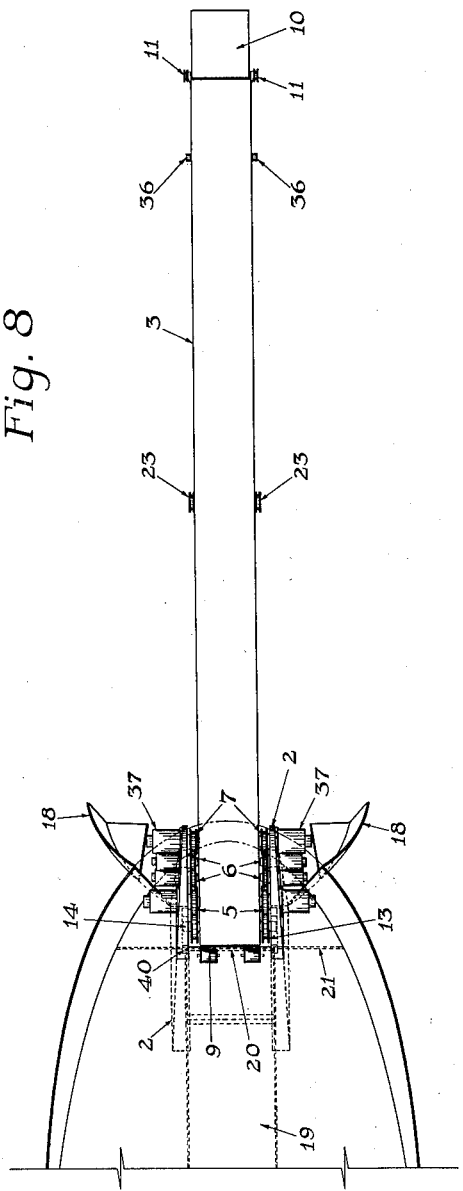
Figure 8 is a plan view of the ship and ramp as shown in Figure 3, with the cables omitted for clearness.

The invention may be applied to ships having different types of prow section and different hinging arrangements to provide access to the hold space and in each case the contour of the buttock lines of the ship in way of the keelsons and king posts, and other features, may be suitably adapted and modified by persons skilled in the art to accommodate the novel structure of the invention. For the purpose of illustration and not for the purpose of limiting the application of the invention, the present drawings in Figure 8 show a prow section having a pair of doors 18 which need not be watertight.

In the bow aft of this prow section is installed a watertight bulkhead 21 having an opening for a watertight door 20, the bottom of the cutout for this door being located just above the maximum load water line of the vessel. The door 20, when opened and laid back, forms part of an inner ramp 19 extending from the bottom of the door opening to below the inner bottom or tank top of the vessel between the keelsons. The door is shown in closed position in Figures 1, 2 and 3, and is open to form a ramp in Figures 4 and 5. The vessel's main ballast tanks would preferably extend from the keelsons outboard to the shell of the vessel to leave a well 31 in the hold space between the keelsons. In this well may be installed a fixed belt conveyor extending from the lower end of the inner ramp 19 aft through the entire cargo space of the vessel. For loading by wheeled carriers the well and conveyor may be covered according to common practice in the art.

The extensible ramp is designated by the numeral 3 and is preferably a decked structure, with side members flat and straight on the bottom, the ramp being wide enough to accommodate a motor truck or the various types of wheeled package carriers. In the stowed position, it is clamped securely on the weather deck as shown in Figure 1. At the outboard end of the ramp is a blade type apron 10 mounted on a shaft 32 so that it may be turned by sheave pulleys 11 rotated by apron control lines 17 secured thereto. The apron control lines are directed through fair-leads 8 below the weather deck from four apron control winches 6. The low position of these fair-leads enables the apron control lines 17 to be used to depress the end of the ramp as shown in Figure 2, as well as to control the position of the apron. These fair-leads are constructed so that the apron lines may quickly be released therefrom to provide slack when necessary. Alternatively, quick detachable sockets and fittings may be provided near the apron so that these lines can easily be parted in stowing the ramp.

The inboard end of the ramp carries dual purpose sheaves 13 on a heavy shaft 14 having ends extending outwardly beyond the sheaves. These sheaves accommodate cables for applying tractive power to the ramp, and, in addition, function as rollers to carry the inboard end of the ramp along the deck. The ramp is extended and retracted by a group of four electrically driven winches and lines on the king posts 2. Two main winches 5 control a pair of lines 12 extending around the sheaves 13 and anchored at 35 on the king posts. Two winches 7 at the peaks of the king posts receive and control outboard suspension lines 16 which are anchored to the ramp at 36.

Utilizing alternating current from the usual auxiliary shipboard generators, the winches are preferably powered with individual direct current motors 37 under conventional thyratron controls having stop, ahead, reverse, jogging and speed regulation stations on the control panels. It is further desirable that the motors for the outboard suspension line winches 7 be equipped for regenerative braking as well as with mechanical brakes to support the ramp in any desired position. The electrical control system forms no part of the present invention, but it is necessary to provide a system for operating opposite pairs of winches synchronously to avoid swinging the ramp. It is necessary, for example, that the winches 5 on the opposite sides of the ramp rotate in unison as though they were connected by a common shaft, because the end of the ramp will swing if one line is taken up faster than the other.

In operation, the ramp is extended by the winches 5 while the winches 7 pay out line, the ramp rolling on the previously mentioned sheaves 13 and a pair of deck rollers 9. As the ramp is extended from the ship the outboard end is supported at the desired elevation by appropriately controlling the speed of winches 7 in coordination with the operation of winches 5. Just before the inboard end of the ramp leaves the deck rollers 9, the ends of the shaft 14 are picked up by entrance portions 40 in a pair of guide channels 4 in the king posts 2 to prevent the end of the ramp from leaving the ship. Each entrance portion 40 extends a short distance horizontally and then the guide channel continues vertically downwardly below the deck and is provided with offset portions 38 and 39 at two levels for guiding the ramp end into registry with either the deck or hold space. By manipulating the winches 5 and 7, the ramp can be lowered and raised in the vertical portions of the guide channels, the tension in lines 16 being effective to seat the shaft 14 securely in the offset portions when the tension in lines 12 is relaxed. The upper sides of the offset portions 38 and 39 slope upwardly to guide the shaft 14 back into the vertical parts of the guide channels when lines 12 are tensioned. The horizontal length of the offsets 38 and 39 provides flexibility for the assembly if the ship swings, and the ends of these offset portions transmit the thrust of the ramp to strength members in the ship. After the ramp has been fully extended, the suspension lines 16 are hooked under brackets 23 at the approximate center of the ramp to support the ramp during loading and unloading operations. When the ramp is provided with additional support in this manner it may be made much lighter and easier to handle than if it had to be entirely self-supporting.

To stow the ramp on deck the operation is reversed, the inboard end being raised by the winches 5 until the shaft 14 enters the entrance offset 40. Then by tightening the lines 16 and slacking off on the lines 12 the ramp may be rolled aft on the deck on sheaves 13 and rollers 9.

Figure 2 illustrates the manner in which the ramp may be used to refloat the ship after grounding. By slackening the lines 16 and tightening the lines 17 the ramp may be inclined so as to engage the bottom in the manner shown, the winches 6 being operated differentially to rotate the apron 10 to form a pusher blade and in the same direction to depress the outboard end of the ramp. In the position shown, the apron has been rotated into engagement with an apron stop 15 on the end of the ramp so as to be in a position to exert a force over enough bearing area to be effective on soft or muddy bottoms. The cables 12, which comprise four strands extending from the anchors 35 and winches 5, are thereby disposed substantially parallel with the ramp to exert a powerful tractive force to both lift and move the bow of the ship. In this position the ramp rests upon the rollers 9 and its inclination may be increased to exert an even greater lifting force if desired.

Figures 3 and 4 show the two normal loading positions for the inner end of the ramp, the outer end of the ramp resting upon the beach above the water line with the apron 10 extended to serve as an approach from the ground to the ramp. In Figure 5 the outer end of the ramp has been elevated to rest upon a high bank, with the apron 10 adjusting itself to the contour of the ground to provide an easy approach for wheeled vehicles or the like.

Figure 6:
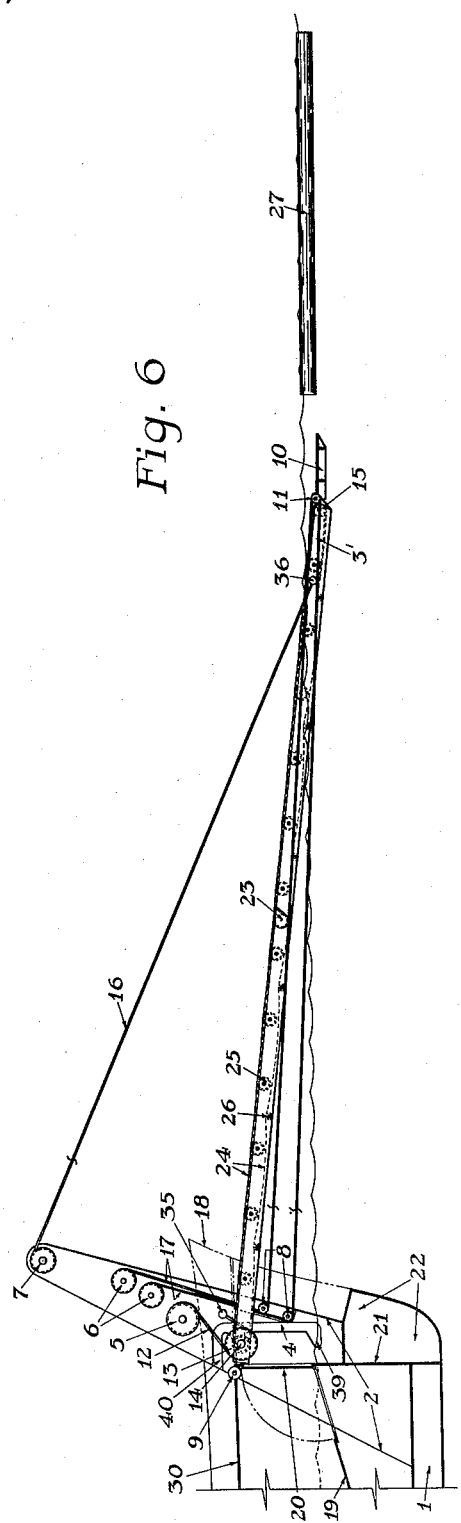
Figure 6 shows a conveyor ramp used to pick up floating cargo.
Figure 7:
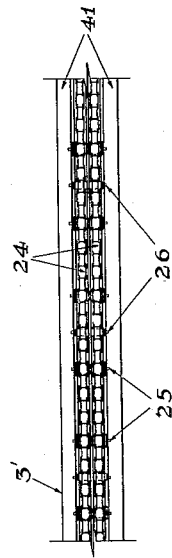
Figure 7 is a fragmentary plan view of the ramp shown in Figure 6.

It is of advantage for certain purposes to incorporate a conveyor into the ramp, and a preferred embodiment of such construction is shown in Figures 6 and 7. The end of the conveyor may, of course, be lowered on shore or on a high bank as shown in the preceding figures, but it is here shown in a new use. In this case the conveyor ramp 3' is used to pick up floating cargo such as the log 27 without grounding the ship. The numeral 24 indicates a moving chain or belt carried by rollers 25 and 26 which may be of conical shape to form a V trough to facilitate the handling of loose material or round objects. In this way the logs or loose material may easily be carried up to the weather deck 30, or to the inner ramp 19, and in either place portable or permanent conveyors may be used to further move the cargo lengthwise within the ship. The conveyor 24 may be motor driven, preferably by driving mechanism carried in the ramp itself.

To facilitate handling and discharging cargo, permanent sections of a belt conveyor system may be set up on the weather deck aft of the stowed position of the ramp and in the hold space in the well between the keelsons. The weather deck in the way of the stowed ramp, the ramp itself and the inner ramp and door, may be the foundations for portable belt conveyor sections. Small package goods and bulk goods such as grain, ore and coal, may easily be handled by such conveyor systems. Goods such as large bales, large boxes, lumber in packages, etc., may be handled by running self-propelled carriers over the ramp and into the ship. It is noted that the conveyor ramp 3' shown in Figure 7 is provided with walkways 41 on each side of the conveyor belt or chain, and the tread width of these walkways may be arranged to accommodate vehicles astride the conveyor, so that the installation of a conveyor in the ramp would not preclude the use of wheeled vehicles thereon.

One mode of operation for loading cargo by conveyor may be carried out as follows: Portable conveyor sections may be set up on the stowed ramp, the ramp run ashore and registered with the weather deck. The portable conveyor may then be moved and set up in the way of the stowed ramp. The ship would then have a continuous conveyor system from ashore above the entire cargo space of the vessel from which cargo could be dropped into any part through small hatches in the weather deck. In unloading, the ramp and its conveyor sections may be registered at the lower level with the inner ramp, the bulkhead door 20 laid back, and the portable conveyor sections set up on the inner end. The ship would then have a continuous conveyor system from below the entire cargo space to the shore into which any part of the cargo could be dumped and run ashore.

The following procedure may be used for loading and unloading self-propelled carriers. The ramp may first be run ashore and registered at the lower level with the inner ramp, the bulkhead door laid back and the carriers run directly into the ship until the hold space is filled. The bulkhead door may then be closed and the ramp registered with the weather deck for taking on any desired deck load. Space for stowing the ramp would be left vacant, or the ramp may be stowed on top of the deck cargo. Unloading would be from the weather deck first and then from the hold space.

A vessel operating off river banks and beach heads in out-of-the-way places would be expected to be grounded frequently. The usual aids to floating a vessel from a grounded position, such as a stream anchor and winch, and the usual trim tanks, may be powerfully assisted by the ramp used as shown in Figure 2 as it can exert a tremendous force at a most effective angle and position. For example, a tractive effort of 300,000 pounds is well within the capabilities of the present construction, and this is more than twice the tractive capacity of the world's most powerful locomotive.

Figure 9:
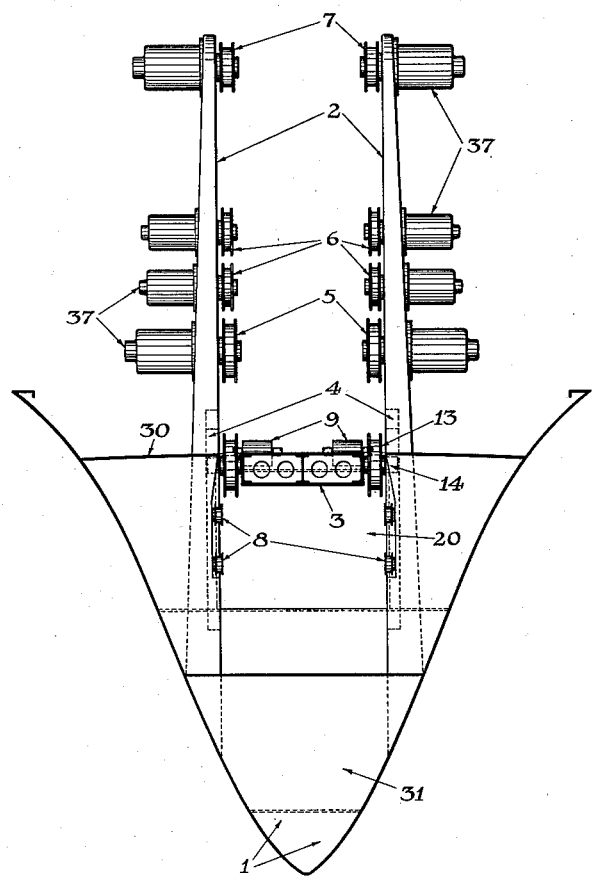
Figure 9 is a cross sectional view taken on the line 9—9 of Figure 3, with the cables omitted.

The various lines from the winches are preferably flat cables of the type used in mines. This shape enables a small bending radius with a large cross section, and also enables the wrapping of a great length of cable on a small winch. As will be observed in Figure 9, the arrangement of the winches might cause them to interfere with each other and with the operation of the ramp if they were to be made large enough to accommodate round cables. In Figures 8 and 9 the cable lines are omitted for clearness, and in the various side views the starboard cables are broken away as they approach the king posts, for the reason that the ship is drawn in section showing only the port king post and port winches whereas the ramp is shown in elevation with both port and starboard cables.

An important advantage deriving from the present construction is the fact that the vessel may be made stronger and more seaworthy than a conventional cargo ship of the same size. This is primarily because of the substantial elimination of deck hatches which tend greatly to reduce the strength of a ship considered as a box beam. By utilizing the present ramp arrangement to load both decks from the end of the ship, all strength members in the deck are left intact by the absence of large hatch openings. The bow opening does not interfere with any strength members.

Although the present invention is particularly adaptable to ships having a pair of keelsons spaced to support king posts in the manner described, it is by no means limited to this type of ship. The king posts may also be mounted in other ways, or they may be attached to auxiliary members added for the present purpose, or to other existing strength members in any suitable manner as will be readily understandable to persons skilled in the art. In any such constructions the objects and advantages of the invention may be fully realized by the use of a ramp of the type described.

Having now described my invention and in what manner the same may be used, what I claim as new and desire to protect by Letters Patent is:

1. In combination, a ship, a portable cargo ramp for loading and unloading the ship, said ramp having an inboard end and an outboard end, a way on the ship for stowing said ramp, said ramp having longitudinal travel in said way, power operated cables engaging the inboard end of said ramp to effect said travel and extend the ramp from the ship with a positive thrust at different vertical angles, and means for elevating and depressing the outboard end of the ramp.

2. In combination, a ship, a portable cargo ramp for loading and unloading the ship, means for extending the ramp from the ship in longitudinal travel, means having an upward pull connected with the outboard end of the ramp for supporting and lifting said outboard end during said longitudinal travel, and means having a downward pull connected with said outboard end to depress said outboard end during said longitudinal travel, whereby the outboard end of the ramp may be either elevated or depressed as the ramp is extended.

3. In combination, a ship, a ramp adapted to be stowed on board said ship, means for longitudinally extending said ramp outwardly from said ship, and means for depressing the outboard end of said ramp as it is being extended to thrust against the sea bottom to assist in freeing said ship when grounded.

4. In combination, a ship, a ramp adapted to be stowed on board said ship, means for extending said ramp from said ship, an apron pivotally mounted on the outboard end of said ramp, and means on said ship for rotating said apron to a rigid position at right angles to said ramp to act as a pusher blade as the ramp is being extended to assist in freeing said ship when grounded.

5. In combination, a ship, a ramp adapted to be stowed on shipboard, means for extending said ramp from said ship, an apron pivotally mounted on the outboard end of said ramp, and cables for turning said apron to a rigid position at right angles to said ramp to form a pusher blade, said cables being led to points on the ship below said ramp to depress the outboard end of said ramp into contact with the sea bottom to use said ramp as a pusher as said ramp is being extended to assist in freeing said ship when grounded.

6. In combination, a ship, a portable ramp, a way on the ship for stowing said ramp, a vertical guide track at one end of said way, means for extending said ramp from said way to engage said ramp with said guide track, and means on said guide track to support said ramp at different levels.

7. In combination, a ship, a portable extensible ramp for loading and unloading the ship, a way on the ship for stowing said ramp, said ramp having longitudinal travel in said way, a vertical guide track at one end of said way, guide means on the inboard end of said ramp engageable with said guide track when the ramp is extended from the ship, means for raising and lowering said inboard end of the ramp on said guide track, and means for raising and lowering the outboard end of the ramp.

8. In combination, a ship, a ramp adapted to be stowed on a deck of said ship, means for extending said ramp lengthwise from said ship, rollers for supporting said ramp as it is being extended, a vertical guide track on said ship engageable by the inboard end of said ramp as it becomes fully extended, means on said guide track to register said ramp with said deck, and means on said guide track to support said ramp at a lower level.

9. In combination, a ship having a weather deck and a hold space, a ramp adapted to be stowed on said deck, means for extending said ramp lengthwise from said ship, and a guide track extending vertically between said hold space and said deck and engageable by the end of said ramp as it becomes fully extended, and means on said guide track to register said ramp either with said deck or said hold space.

10. In combination, a ship having a deck, a ramp adapted to be stowed on said deck, means for extending said ramp lengthwise from said ship, a roller at the edge of said deck adapted to support said ramp as it is being extended, a guide track adjacent said roller, roller means supporting the inboard end of said ramp on said deck as it is being extended, and means on the inboard end of said ramp adapted to engage said guide track as said ramp becomes fully extended, for registering said ramp in loading position.

11. In combination, a ship having a deck, an extensible ramp adapted to be stowed on said deck, roller means at the edge of said deck for supporting and guiding said ramp as it is being extended from said ship, guide tracks adjacent said roller means, a pair of sheaves on the inboard end of said ramp adapted to support said ramp on said deck and to receive cables for extending said ramp, and a shaft extending through said sheaves and adapted to engage in said guide tracks as the ramp becomes fully extended.

12. In combination, a ship, a portable cargo ramp having inboard and outboard ends, a way on the ship for stowing said ramp, a pair of main cables engaging the inboard end of said ramp and leading to one end of said way for extending said ramp lengthwise from the way, a pair of suspension cables for supporting the outboard end of said ramp as it is being extended, and winches for tensioning said cables.

13. In combination, a ship, an extensible ramp adapted to be stowed on shipboard, a pair of cables engaging said ramp for extending said ramp from said ship, a pair of cables for supporting the outboard end of said ramp as it is being extended and for retracting said ramp, an apron pivotally mounted on the outboard end of said ramp to form a pusher blade for moving the ship, cables operatively connected with said apron for rotating said apron to different angular positions on said ramp, and an individual winch for tensioning each of said cables.

14. An extensible ramp for shipboard use comprising an elongated ramp structure having outboard and inboard ends, an apron pivotally mounted on said outboard end to form a pusher blade for moving the ship, cable operated means for rotating said apron, a pair of cable attachments on said ramp near said outboard end, a pair of cable hooks on the sides of said ramp at approximately its mid length, a pair of sheaves on the inboard end of said ramp adapted to support said ramp on a deck surface, and a shaft projecting from said sheaves on opposite sides of said ramp.

15. In combination, a ship, a portable ramp having inboard and outboard ends, a way on the ship for stowing said ramp, cable guiding and supporting means adjacent one end of said way, a pair of cables engaging said cable guiding and supporting means and also engaging the inboard end of said ramp to exert a tractive effort on the stowed ramp to extend said ramp from said way, said cables being operative after said ramp is extended from said way to support and lower the inboard end of the ramp below said way, and a pair of cables supporting the outboard end of the extended ramp.

16. In combination, a ship, an extensible ramp adapted to be stowed on shipboard, a pair of cables arranged to exert a tractive effort on the inboard end of said ramp to extend said ramp from said ship, a pair of cables for supporting the outboard end of said ramp as said ramp is being extended and to retract said ramp to said ship, an apron pivotally mounted on the outboard end of said ramp to form a pusher blade for moving the ship, a plurality of cables extending from said ship to said pivotal mounting for rotating said apron to different angular positions, roller means for supporting said ramp on the edge of said deck when said ramp is partially extended, and fair-leads for said last named plurality of cables on said ship below the level of said roller means to depress the end of said ramp when said ramp is partially extended.

17. In combination, a ship having a pair of keelsons, a hold space and a deck; a pair of spaced king posts integral with said keelsons and extending upwardly therefrom in the bow of the ship, an extensible ramp adapted to be stowed on said deck in a way between said king posts, a plurality of winches mounted on said king posts, and cables on said winches for extending said ramp from said ship and retracting said ramp on shipboard.

18. In combination, a ship having a pair of keelsons, a hold space and a deck; a pair of king posts integral with said keelsons and extending upwardly therefrom in the bow of the ship, an extensible ramp, a way on said ship deck between said king posts for stowing said ramp, a plurality of winches mounted on said king posts for extending and retracting said ramp, guide tracks in said king posts extending between said deck and said hold space, and means on the inboard end of said ramp engaging in said guide track when said ramp is extended to register the inboard end of said ramp either with said deck or with said hold space.

19. In combination, a ship having a pair of keelsons, a hold space and a deck; a bulkhead across the forward end of said hold space and extending up to said deck, an inner ramp in said hold space, a watertight door in said bulkhead leading to said inner ramp, a pair of king posts integral with said keelsons and extending upwardly therefrom in the bow of the ship, a hinged prow section forward of said bulkhead and said king posts, an extensible ramp, a way on said deck between said king posts for stowing said extensible ramp, and means on said king posts for extending said ramp from the ship for registering the inboard end of said ramp either with said deck or with said inner ramp and for retracting said ramp to stowed position in said way.

20. In combination, a ship, a pair of king posts extending upright in the bow of the ship, an extensible ramp, a plurality of winches on said king posts, and a plurality of cables operable by said winches to extend and retract said ramp, one pair of said cables being arranged to exert a tractive effort on the inboard end of said ramp to extend said ramp from said ship, another pair of said cables extending from the peaks of the king posts to support the outboard end of the ramp and to retract the ramp on shipboard, and additional cables extending from the lower portions of said king posts for depressing the outboard end of the ramp and for retracting the ramp.

21. In combination, a ship, a pair of spaced king posts in the bow of the ship, a plurality of winches mounted on said king posts, a ramp extendible to various positions between said king posts, a plurality of cables on said winches for controlling the movements of said ramp, one pair of said cables being arranged to exert a tractive effort on the inboard end of said ramp to extend said ramp from the ship, and another pair of said cables extending from the peaks of said king posts for supporting the outboard end of said ramp and for retracting said ramp on shipboard, and means for supporting the mid portion of said ramp from said last named cables when said ramp is fully extended.

22. In combination, a ship, a pair of spaced king posts in the bow of the ship, an extensible ramp, a deck having a way for said ramp extending aft from between said king posts, roller means at the end of said way in the edge of said deck between said king posts, a plurality of winches mounted on said king posts, one pair of said winches being approximately on the level of said ramp when stowed on said way and having cables arranged to exert a tractive effort on the inboard end of said ramp for extending said ramp from said ship, another pair of said winches being disposed in the peaks of said king posts and having cables for supporting the outboard end of said ramp when said ramp is extended, and other pairs of said winches having cables extending to the outboard end of said ramp, and fair-leads for said last named cables on said king posts below the level of said roller means to direct said cables for depressing the outboard end of said ramp.

23. In combination, a ship having a deck and a hold space, an extensible ramp adapted to be stowed on deck, guide means on the inboard end of said ramp, a vertical guide track extending from said deck to said hold space, an entrance to said guide track arranged to receive said guide means as said ramp becomes fully extended from the ship, and means in said guide track for registering said end of said ramp either with said deck or said hold spaces.

24. In combination, a ship having a deck and a hold space, an extensible ramp adapted to be stowed on deck, guide means on the inboard end of said ramp, a vertical guide track extending from said deck to said hold space, an entrance to said guide track arranged to receive said guide means as said ramp becomes fully extended from the ship, and means in said guide track for registering said end of said ramp either with said deck or said hold space, said registering means being constructed and arranged to permit and accommodate swinging of the ship with respect to the ramp while said ramp is fully extended and in use without binding of said guide means.

25. In combination, a ship having a deck and a hold space, an extensible ramp adapted to be stowed on deck, guide means on the inboard end of said ramp, a vertical guide track extending from said deck to said hold space, an entrance to said guide track arranged to receive said guide means as said ramp becomes fully extended from the ship, rearwardly directed offsets in said guide track at different levels below said entrance for registering said end of said ramp either with said deck or said hold space, and a winch above and forward from said offsets for raising and lowering the end of the ramp in the guide track and for pulling said guide means out of said offsets.

26. In combination, a ship having a deck and a hold space, an extensible ramp having a vertical guide track for its inboard end, means for registering said ramp at deck level on said guide track to dump cargo into said hold space in loading, and means for registering said ramp at a lower level on said guide track in communication with the bottom of said hold space to receive cargo dumped from said hold space, whereby the interior loading and unloading of said hold space may be accomplished by gravity means.

27. In combination, a ship and a ramp, a way on a deck of said ship for stowing said ramp, a cable extending slightly above the level of said deck and engaging the inboard end of said ramp to cause the ramp to travel in said way for extending said ramp beyond the ship, and a cable directed above said first cable and connected with the outboard end of said ramp for supporting said outboard end as it is being extended, said last cable being also directed to retract said ramp back into stowed position on said way.

28. In combination, a ship having a weather deck and a hold space, a fixed inner ramp in said hold space, a portable ramp, means for stowing said portable ramp on said weather deck, means for extending said portable ramp from said ship, and a vertical guide track engaging the inboard end of said portable ramp when the ramp is extended, said guide track having means to register the portable ramp with either said weather deck or said inner ramp.

THOMAS J. FLIPPIN.

REFERENCES CITED

The following references are of record in the file of this patent:

UNITED STATES PATENTS

| Number | Name | Date |
|---|---|---|
| 34,329 | Grundt | Feb. 4, 1862 |
| 185,283 | Bourke | Dec. 12, 1876 |
| 374,635 | Simpson | Dec. 13, 1887 |
| 785,400 | Buchanan | Mar. 21, 1905 |
| 939,878 | Urie | Nov. 9, 1909 |
| 1,038,176 | Millican | Sept. 10, 1912 |
| 1,105,537 | Savoy | July 28, 1914 |
| 1,150,699 | Nicolonides | Aug. 17, 1915 |
| 1,270,903 | Weismantel | July 2, 1918 |
| 1,411,320 | Wilson | Apr. 4, 1922 |
| 1,568,307 | Acocella | Jan. 5, 1926 |
| 1,882,512 | Lovejoy | Oct. 11, 1932 |

FOREIGN PATENTS

| Number | Country | Date |
|---|---|---|
| 478,253 | Great Britain | Jan. 14, 1938 |